United States Patent [19]

Späth

[11] Patent Number: 4,983,065

[45] Date of Patent: Jan. 8, 1991

[54] CONNECTING ELEMENT

[75] Inventor: Werner F. Späth, Wutöschingen-Horheim, Fed. Rep. of Germany

[73] Assignee: Exibelco GmbH, Allschwil, Switzerland

[21] Appl. No.: 357,163

[22] Filed: May 26, 1989

[51] Int. Cl.$^5$ .............................................. F16B 9/02
[52] U.S. Cl. ................................... 403/252; 403/255; 403/322
[58] Field of Search ............... 403/252, 254, 255, 322, 403/247, 264, 407.1, 231, 245, 93, 96, 374, 409.1

[56] References Cited

U.S. PATENT DOCUMENTS

| | | | |
|---|---|---|---|
| 4,345,849 | 8/1982 | Stenemann | 403/252 |
| 4,455,103 | 6/1984 | Hackenberg | 403/322 X |
| 4,549,831 | 10/1985 | Lautenschläger, Jr. | 403/231 |
| 4,664,548 | 5/1987 | Brinkmann | 403/231 X |
| 4,690,582 | 9/1987 | Maier et al. | 403/322 X |
| 4,787,769 | 11/1988 | Michael | 403/252 |

FOREIGN PATENT DOCUMENTS

| | | | |
|---|---|---|---|
| 0000525 | 2/1979 | European Pat. Off. | 403/252 |
| 0059463 | 9/1982 | European Pat. Off. | 403/252 |
| 0160196 | 11/1985 | European Pat. Off. | 403/252 |
| 2732910 | 2/1979 | Fed. Rep. of Germany | 403/252 |

*Primary Examiner*—Peter M. Cuomo
*Attorney, Agent, or Firm*—Goodman & Teitelbaum

[57] ABSTRACT

A connecting element for the detachable connecting of two frame components, which, within a casing, has at least one retaining element, with which the connecting element and also the frame profile can be connected in a detachable manner with the support profile. Within the casing, an eccentric cam is rotatably positioned to conduct the retaining element in a longitudinally movable manner in the casing so that a component of the retaining element projecting out of the frontal side of the casing can be brought into engagement with an undercut longitudinal groove of the support profile. In the discharge position of the retaining element, the eccentric cam head of the eccentric cam can be pressed into the casing against the force of a spring to be engaged in a boring of a frame profile. A safety mechanism prevents, in the insertion position of the retaining element, the axial movability of the eccentric cam. In order to prevent an unintentional pressing in of the eccentric cam, it is provided that the safety mechanism consists of a projection provided on the eccentric cam, and a recess is constructed in the casing. The projection and the recess are positioned to one another in such a manner that the projection, in the discharge position, can be pressed into the recess, and thereby permit an axial movability of the eccentric cam, but, in the insertion position, can not be pressed in, so that the eccentric cam is thereby prevented from having any axial movability.

11 Claims, 2 Drawing Sheets

CONNECTING ELEMENT

BACKGROUND OF THE INVENTION

The invention concerns a connecting element for the detachable connecting of two frame components, particularly of a support profile and of a frame profile, whereby the connecting element is positioned in a stationary manner in the frame profile which is constructed as a hollow profile and has, within a casing, at least one retaining element with which the connecting element, and thereby the frame profile as well, can be connected with the support profile in a detachable manner, and whereby an eccentric cam is positioned within the casing in a pivot-supported manner, which cam has at least one eccentric head, one eccentric cam disk and one support stud, by means of which the retaining element is conducted in a longitudinally movable manner in the casing, through which a component of the retaining element projecting out of the frontal side of the casing can be brought into contact with an undercut longitudinal groove of the support profile, and whereby the eccentric head of the eccentric cam which can be pressed into the casing against the force of a spring can be locked into a boring of the frame profile, as well as with a safety mechanism preventing the axial mobility of the eccentric cam into the insert position of the retaining element.

Such types of connecting elements are known in various forms of construction, and are used in particular for the connecting of support profiles and frame profiles, by means of which trade exhibition booths, among other types, are constructed. This connection should, on the one hand, be extremely solid, but, on the other hand, it should also be easy to produce and to detach again. For the easy installation and disassembly of a connecting element in a frame profile, the spring-loaded eccentric cam can be pressed, in the manner of a pushbutton, into the casing of the connecting element.

In order that this insertion not take place in an incorrect manner, and in particular not when the profile bars have been assembled, it has been proposed, in DE-C-31 53 232, to provide a stationary catch as a safety mechanism in the interior of the support casing, which, relative to the end part of the retaining element serving for the installation of the eccentric cam in the direction of insertion, is positioned in such a manner that the catch, in the discharge position of the retaining element is indeed positioned outside the end part, and thus permits its cross-swivelling capacity, but, in the insert position of the retaining element, it lies under the end piece, and blocks its cross-swivelling capacity.

Such a prevention of insertion has the disadvantage that the geometry of the casing must permit the application of a catch which is solid with the casing, whereby the retaining element must, to be sure, be inserted far enough into the casing and through the eccentric disk, on the one hand, that a secure connection of the frame profile with the support profile is ensured, but, on the other hand, however, the eccentric cam must be insertable if the retaining element is located in the discharge position. This has in practice as its consequence that the catch which is solidly attached to the casing is so dimensioned that it essentially only comes to lie below the retaining element in the end phase of the tightening process, and thereby blocks its cross-swivelling capacity.

It has, however, proven desirable that the eccentric cam be prevented from an unintended pressing inward, even during an early stage of the connecting process.

In EP-B-O 160 196, a connecting element has thus already been proposed, in which the eccentric disk is conducted, almost throughout the entire connecting process, into an aperture in a casing of the connecting element, so that the eccentric cam can not be pressed into the casing. Also, in such a type of prevention of inwardly pressing motion, the geometric relations of the connecting elements must permit the eccentric cam disk to be located in the aperture of the casing during the connecting process. Only if the retaining element is in its discharge position should it be able to be pressed inwardly. If the retaining element has been solidly tightened, the eccentric cam disk no longer need be located in the aperture of the casing, since the force-closure of the retaining element already prevents its insertion capacity itself.

It is thus the task of the present invention to create a connecting element of type already stated, in which a safety mechanism is provided which, in one defined range of the connecting process, prevents an unintended pressing in of the eccentric cam, but, however, within a likewise predetermined range, and particularly in the discharge position of the retaining element, permits the axial movability of the eccentric cam.

SUMMARY OF THE INVENTION

This task is essentially solved, in accordance with the invention, through the fact that the safety mechanism consists of a projection provided on the eccentric cam, particularly on the support stud of the eccentric stud, and a recess constructed in the casing, whereby the projection and the recess are positioned relative one another in such a manner that the projection may, to be sure, be pressed into the recess in the area of the discharge position of the retaining element, and thereby permit an axial movability of the eccentric cam, but, however, within the insertion position of the retaining element, it may not be pressed in, and the eccentric cam is thereby prevented from axial movability. Such a prevention of inwardly pressing movement can be applied with slight expense, and even, if necessary, subsequent to the most varied connecting elements. The range in which a pressing inwardly is to be prevented ay thereby be determined by individual cases.

The projection may be produced, in accordance with the invention, in a simple manner, if it is constructed as a single unit with the support stud.

In accordance with one preferred development of the invention, the projection may be a bolt or a pin attached to the support stud. These may also still be subsequently installed on the support stud by means, for example, of welding.

One further development of the invention provides that the projection has a bevelling. In this manner, the projection may be pressed deep into the clearance.

For the secure guidance of the support stud in the casing, the guide is, in accordance with the invention, constructed as a boring in the casing base, the edge area of which projects into the casing in a crater-shaped manner.

In one further development of this concept of the invention, the projection is positioned on the support stud in such a manner that, in a position which blocks the pressing in of the eccentric cam, it contacts the lower edge of the crater-shaped boring, or has only a minimal distance from the same. In this manner, it is attained that the retaining element is securely guided during the tightening process, and may in particular not spring out from the eccentric cam, which it can in the case of two-part retaining elements.

In one further advantageous development of the invention, the recess is constructed in such a manner that it extends from the boring proceeding into the casing base. Through this fact, the projection constructed on the support stud can, in the discharge position of the retaining element, be pressed into the recess in a manner free from problems.

The recess is, in a suitable manner, so dimensioned that it is somewhat larger than the projection on the support stud.

In one advantageous further development of the concept of the invention, it has proven suitable to produce the casing from cast metal and the casing base from sheet steel. In this way, the casing may, on the one hand, be produced simply and in a cost-effective manner, and, on the other hand, the crater-shaped boring can easily be applied to the casing base by means of stamping.

Further characteristics, advantages and possibilities of application of the invention proceed from the following description of one example of execution, which is depicted in the drawings. In this, all characteristics described and/or depicted in illustrated form comprise, either in themselves or in suitable and preferred combinations, the object of the invention.

DETAILED DESCRIPTION OF THE PREFERRED EMBODIMENT

Figure 1:
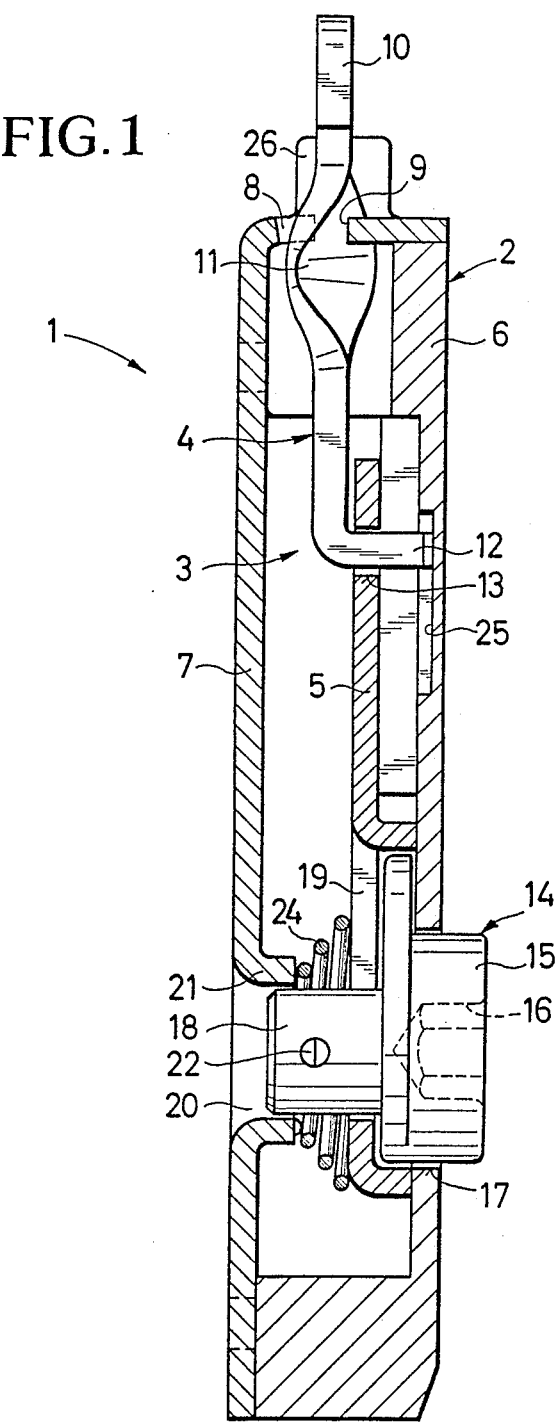
FIG. 1: In partially cut-away depiction, a lateral view of a connecting element in accordance with the invention.
Figure 2:
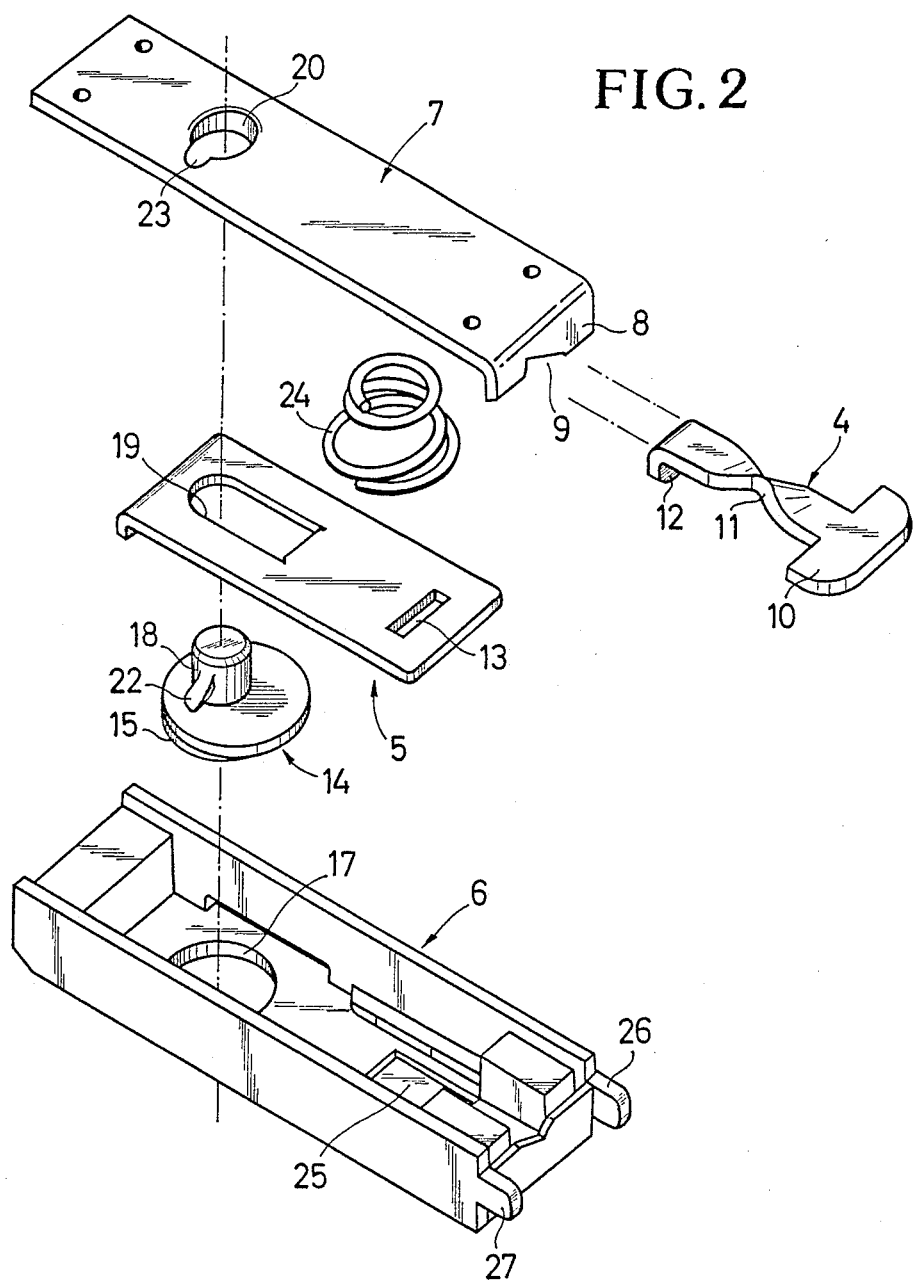
FIG. 2: An exploded depiction of the connecting element depicted in FIG. 1.

The connecting element (1) has a casing (2), in which a retaining element (3) is positioned in a longitudinally displaceable manner. The retaining element (3) consists of the fixing element (4) and a pulling element (5). The casing (2) is constructed in two parts, and consists of a casing body (6) and a casing base (7). The casing base (7) is constructed in an angled manner on its forward end, whereby the angled part (8) forms the frontal side of the casing.

In the angled part (8) of the casing base (7), the upper part of an obliquely proceeding aperture (9) is constructed, while the lower part of the obliquely proceeding aperture (9) is constructed on the frontal side of the casing body (6). Through this aperture (9), there extends the fixing element (4), which has, on its forward end, a hammer-shaped traverse lock bar (10), with which a symmetrically twisted section (11) is connected. The other end of the fixing element (4) is formed by a hook bracket (12), which is mounted in a slot-shaped recess (13) in the pulling element (5), which is similar to a slide spring.

The pulling element (5) is moved, by means of an eccentric cam (14), in the longitudinal direction of the casing (2). The eccentric cam head (15) of the eccentric cam (14) has a tool reception (16) for the activation of the eccentric cam (14), and projects through an aperture (17) in the casing body (6). The support stud (18) of the eccentric cam (14) lying opposite the eccentric cam head (15) projects through a longitudinal aperture (19) in the pulling element (5) and through a boring (20) in the casing base (7). The edge of the boring (20) is bent inwardly, and forms a guide (21) for the support stud (18). Between the pulling element (5) and the casing base (7), a pressure spring (24) is positioned, through which the eccentric cam head (15) can be pressed into the casing in the manner of a pushbutton. A projection (22) is positioned on the support stud (18). The projection (22) is constructed, in the example of execution, as a bolt or pin flattened on one side, which is welded onto the support stud (18). The projection (22) can, however, also be constructed in a single piece with the support stud, and have various selected forms. In the area of the projection (22), a recess (23) is provided in the casing base (7), which recess preferably extends from the boring (20) proceeding into the casing base (7). The recess (23) is positioned in the casing base (7) in such a manner that the projection (22) can, in the discharge position of the retaining element (3), engage with the recess (23). In order, in consideration to dimensional tolerances in the discharge position of the retaining element (3) conditioned by manufacturing, to also ensure a pressing in of the eccentric cam (14), the recess (23) extends over an angled area, which is somewhat larger than the dimensions of the projection (22) would require. The size of the recess (23) determines the degree to which the eccentric cam (14) can be pressed inwardly. Through this means, this area can be individually determined, and, if necessary, subsequently determined as well, independently of the geometry of the connecting element, its casing, the retaining element, etc.

For the connection of profile rods (not depicted), particularly of frame and support profiles, the connecting element (1) is first of all inserted into a frame profile. For this, the eccentric cam head (15) projecting out of the casing (2) of the connecting element (1) must be pressed into the casing (2). This should, however, only be possible in the discharge position of the retaining element (3). In this position, the projection (22) lies opposite the recess (23), so that the motion path of the eccentric cam (14) is not blocked by the projection (22). Since the projection (22) in this position can penetrate through the recess (23), the eccentric cam (14) can be pressed into the casing (2). Through this, the connecting element (1) can be inserted into the frame profile, until the pressure spring (24) presses the eccentric cam head (15) out of the casing (2) again, and into a correspondingly dimensioned boring, which is not depicted, provided in the frame profile, and can snap it into this boring. Through this engagement of the eccentric cam head (15) into the boring of the frame profile, the connecting closure (1) in the interior of the frame profile is ensured, and can not fall out by itself. A disassembly can only take place through a conscious application of pressure on the eccentric cam head (15) and the simultaneous removal of the connecting element (1). Through this means, the pressure spring (24) has, at the same time, the task of securing the connecting element (1) in the frame profile in its mounting position.

In order to fix a profile rod with frame profile in the selected position of the support profile, the eccentric cam head (15) needs only to be turned, for which purpose a tool is inserted into the tool reception mount (16) of the eccentric cam head (15), which is accessible through the boring in the frame profile. In one turn of the eccentric cam (14), the fixing element (4) is drawn into the casing (2) through the slot aperture (9). As soon as the twisted section (11) reaches the area of the slot aperture (9), the fixing element (4) is turned. The rotation of the hammer-shaped traversal lock (10) by one half stroke length amounts to approximately 30°. In order that the hook bracket (12) of the fixing element (4) not be twisted in the casing (2), a clearance (25) is provided in the casing body (6).

As an aid for insertion, and as protection for the traverse lock (10) which is shaped like a hammer head, two forwardly projecting bars (26, 27) are provided on the casing body (6).

In the coupling position, both profile rods are solidly fixed with one another. An axial movability of the eccentric cam (14) is not possible in the predetermined area, even during the attaching process, since the projection (22) lies closely on the edge of the boring (20) which is bent downwardly. Through this means, it is ensured that the profile bars can not come to leave engagement with the eccentric cam head (15) again as the result of incorrect axial pressure.

In order to again detach the support profile and the frame profile from one another, the eccentric cam (14) needs only to be turned back into the discharge position of the retaining element (3), and the traverse lock bar (10) to be drawn out of the support profile.

The present invention is not restricted to the depicted form of execution, which is the object of EP-B-O 160 196, but can be used in all connecting elements, with which the framework components, such as support profiles and frame profiles, are to be connected with one another. Thus, the prevention of insertion in accordance with the invention also allows the use of connecting elements, such as are described for example, in EP-B-O 059 463, EP-A O 070 362, and EP-A-O 178 369, to name only a few.

What is claimed is:

1. A connecting element (1) for detachably connecting two frame components, particularly a support profile and a frame profile, the connecting element (1) being positioned in a stationary manner in the frame profile and constructed with a hollow profile, said connecting element having a casing (2) with at least one retaining element (3) therein and being connected with the support profile in a detachable manner, an eccentric cam (14) being positioned within the casing in a pivotable manner, said eccentric cam having at least one eccentric head (15), one eccentric cam disk and one support stud (18), said retaining element (3) being actuated in a longitudinally movable manner in the casing (2) by said eccentric cam, in which a component of the retaining element (3) projecting out of a frontal side of the casing (2) can be brought into contact with an undercut longitudinal groove of the support profile, said eccentric head (15) of the eccentric cam (14) being axially movable into the casing (2) against a spring (24), a safety mechanism preventing axial movement of the eccentric cam (14) during the longitudinal actuation of the retaining element (3), wherein said safety mechanism comprises a projection (22) provided on on the support stud (18) of the eccentric cam (14), and a recess (23) provided in the casing (2), whereby the projection (22) and the recess (23) are aligned with one another in such a manner that the projection (22) may be pressed into the recess, and thereby permitting axial movement of the eccentric cam (14), and when the projection and the recess are misaligned, the eccentric cam is thereby prevented from axial movement during the longitudinal actuation of the retaining element.

2. A connecting element in accordance with claim 1, wherein the support stud (18) and the projection (22) are constructed in a single piece.

3. A connecting element in accordance with claim 2, wherein the projection (22) is a bolt or pin attached to the support stud (18).

4. A connecting element in accordance with claim 2, wherein the projection (22) has a bevelling.

5. A connecting element in accordance with claim 1, wherein the recess (23) tightly borders on a guide (21) of the support stud (18) of the eccentric cam (14).

6. A connecting element in accordance with claim 5, wherein the guide (21) of the support stud (18) is constructed as a boring (20) in the casing base (7), an edge area of which projects into the casing (2) in a crater-shaped manner.

7. A connecting element in accordance with claim 6, wherein the projection (22) on the support stud (18) is positioned in such a manner that, in a position preventing the pressing in of the eccentric cam (14), it touches a lower edge of the crater-shaped boring (20) or has only a minimal distance therefrom.

8. A connecting element in accordance with claim 6, wherein the recess (23) extends into a casing base (7) proceeding from the boring (20).

9. A connecting element in accordance with claim 1, wherein the recess (23) is so dimensioned, that it is somewhat larger than the projection (22) on the support stud (18).

10. A connecting element in accordance with claim 1, wherein the recess (23) encloses a greater angular section than corresponding to the dimensions of the projection (22).

11. A connecting element in accordance with claim 1, wherein its casing body (6) consists of cast metal, and its casing base (7) consists of sheet steel.

* * * * *